Aug. 29, 1933.      D. M. BARDON ET AL      1,924,391
TROLLING WINCH
Filed March 21, 1931      6 Sheets-Sheet 1

DONIS M. BARDON
FREDERICK G. GREAVES
SERN P. WATT
INVENTOR

BY Cook & Robinson
ATTORNEY

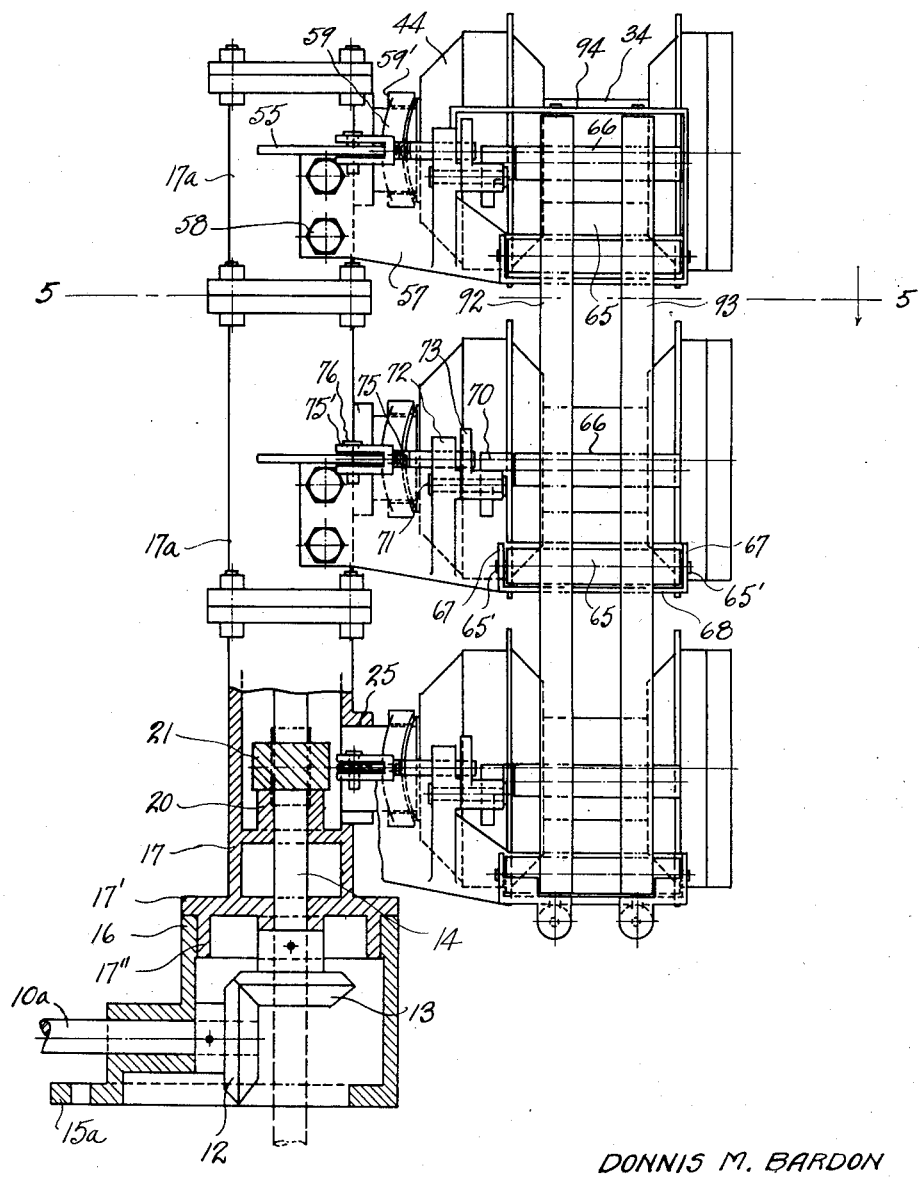

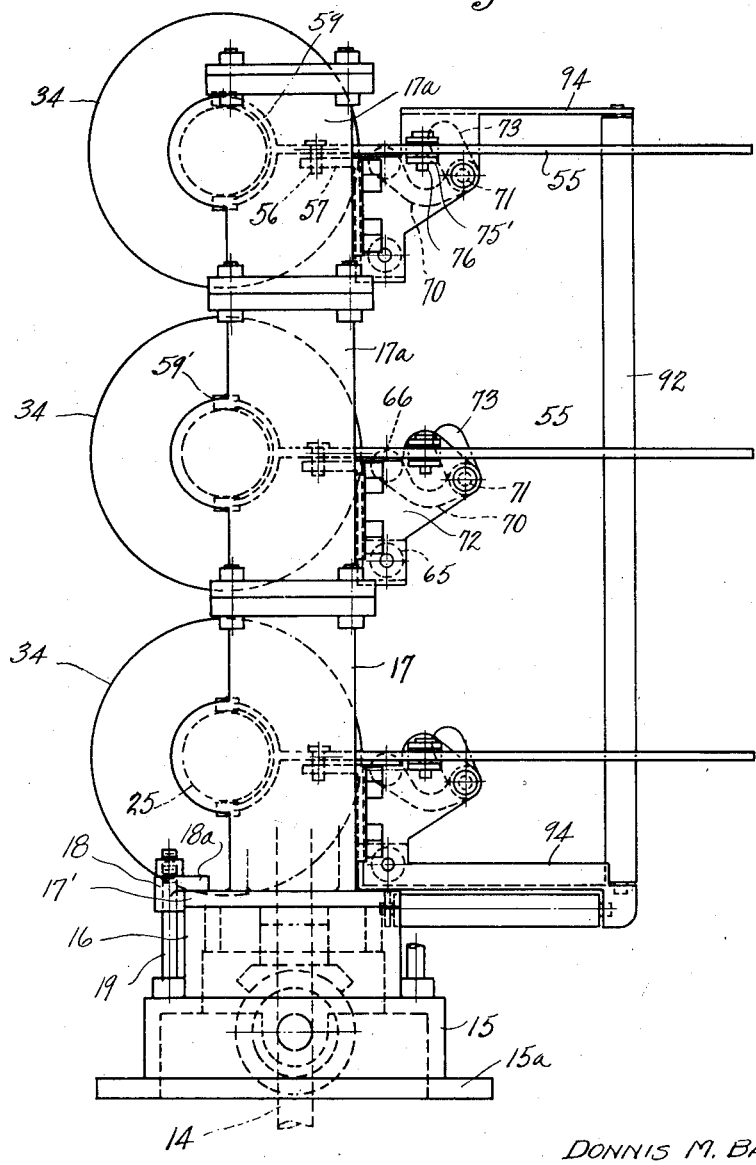

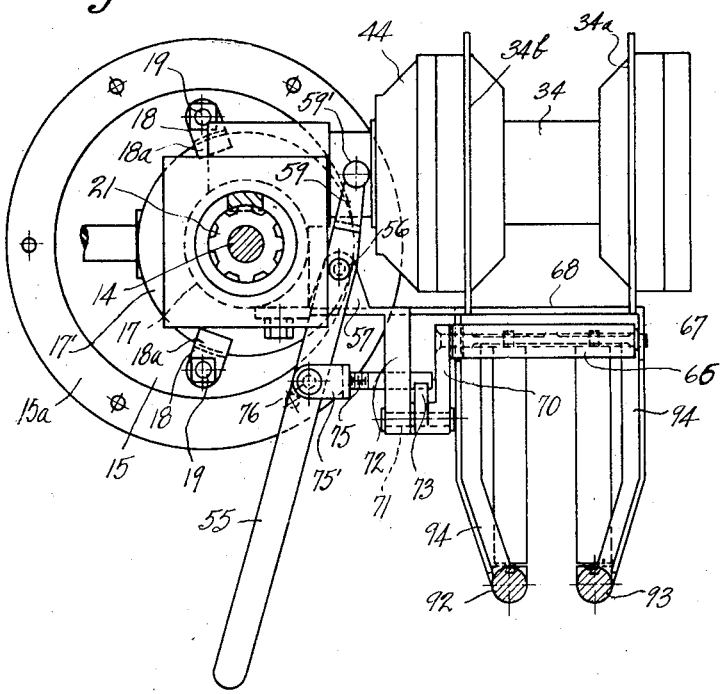
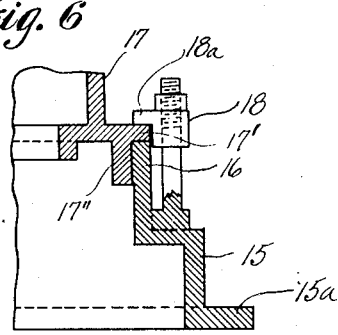

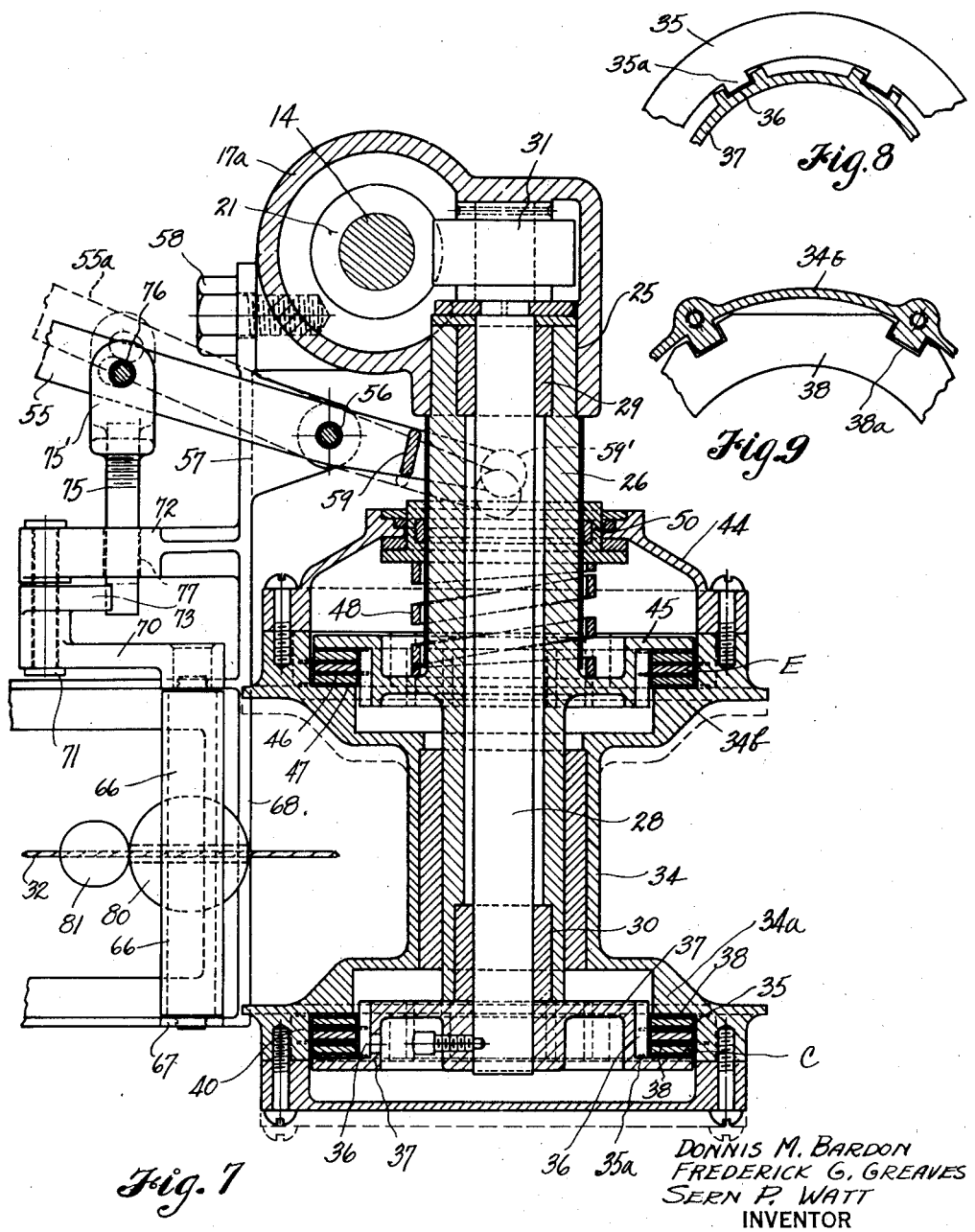

Aug. 29, 1933.   D. M. BARDON ET AL   1,924,391
TROLLING WINCH
Filed March 21, 1931   6 Sheets-Sheet 6

DONNIS M. BARDON
FREDERICK G. GREAVES
SERN P. WATT
INVENTOR

BY
Cook & Robinson
ATTORNEY

Patented Aug. 29, 1933

1,924,391

UNITED STATES PATENT OFFICE 1,924,391

TROLLING WINCH

Donis M. Bardon, Frederick G. Greaves and Sern P. Watt, Seattle, Wash., assignors to Bardon-Greaves Co., Incorporated, a corporation of Washington Application March 21, 1931. Serial No. 524,328

11 Claims. (Cl. 254—185)

This invention relates to improvements in cable winding devices, and more particularly to machines of that character for winding in or paying out cables, for hoisting or hauling, or lines from ships or boats when used for fishing, sounding, or for other similar purposes; it being the principal object of the invention to provide an improved type of machine especially useful for trolling, and which is adapted to be mechanically driven by connection with the power shaft of the boat or ship in which it is used, or driven by independent power supply of other obvious types, and to be manually controllable in paying out the cable and when drawing it in.

It is also an object to provide a machine which has an automatic means embodied therein for stopping the winding action at any point of the line while it is being drawn in.

Another object of the invention resides in the provision of a device of the above character that may be so disposed in working position on the boat that it will occupy very small deck space, and wherein novel means is provided for swinging the winding drums from within the boat to positions at which they are partially or wholly projected outboard.

A still further object of the invention resides in the provision of a device of the above character embodying a plurality of cable reeling units with individual control means.

Other objects of the invention reside in the details of construction of the various parts of the machine and in their combination and mode of operation, as will hereinafter be described.

In accomplishing these and other objects of the invention, we have provided the improved details of construction, the preferred forms of which are illustrated in the accompanying drawings wherein—

Fig. 3 is a view of one of the machines, shown partly in section to better illustrate the driving connection.

Fig. 4 is a side view of the device as shown in Fig. 3.

Fig. 5 is a horizontal section of the machine taken on the line 5—5 in Fig. 4.

Fig. 6 is a sectional detail showing the manner of mounting the main standard for rotation in the base of the machine.

Fig. 7 is an enlarged, horizontal section of the winding drum or reel of a unit of the machine.

Figs. 8 and 9, respectively, are sectional views of parts of the clutch mechanism used in the cable winding drum.

Figure 10:
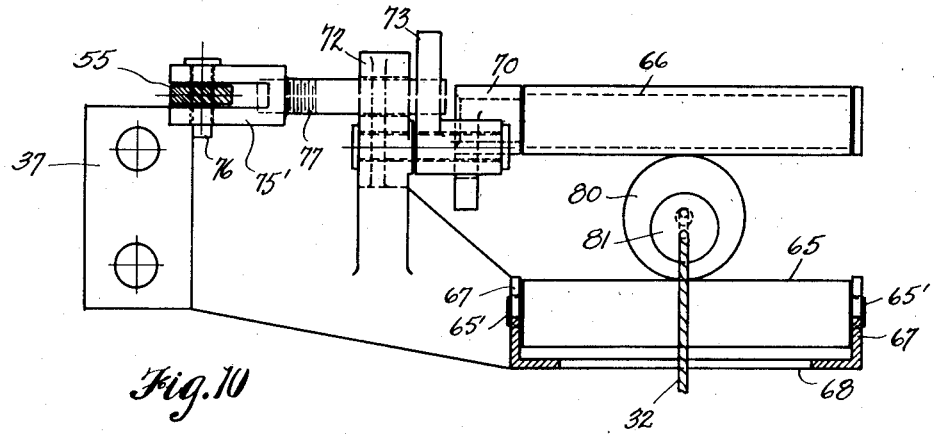

Fig. 10 is a side view of the automatic clutch release or stop mechanism associated with the winding drum.

Figure 11:
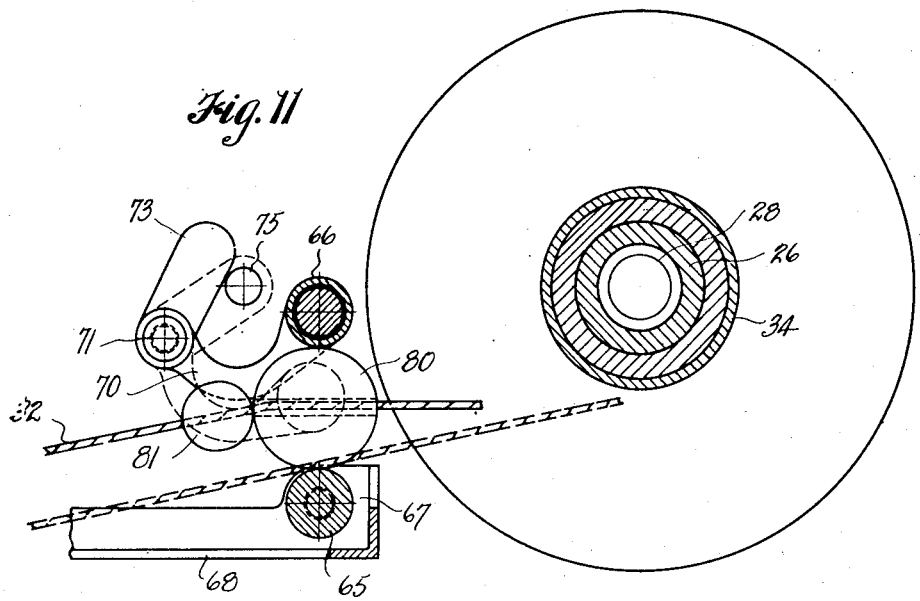

Fig. 11 is a section on the line 11—11 in Fig. 10.

Figure 12:
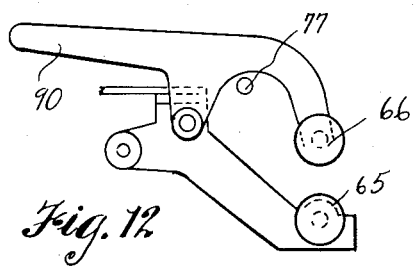

Fig. 12 is a detail, illustrating an alternative construction for manually setting the clutch.

Figure 1:
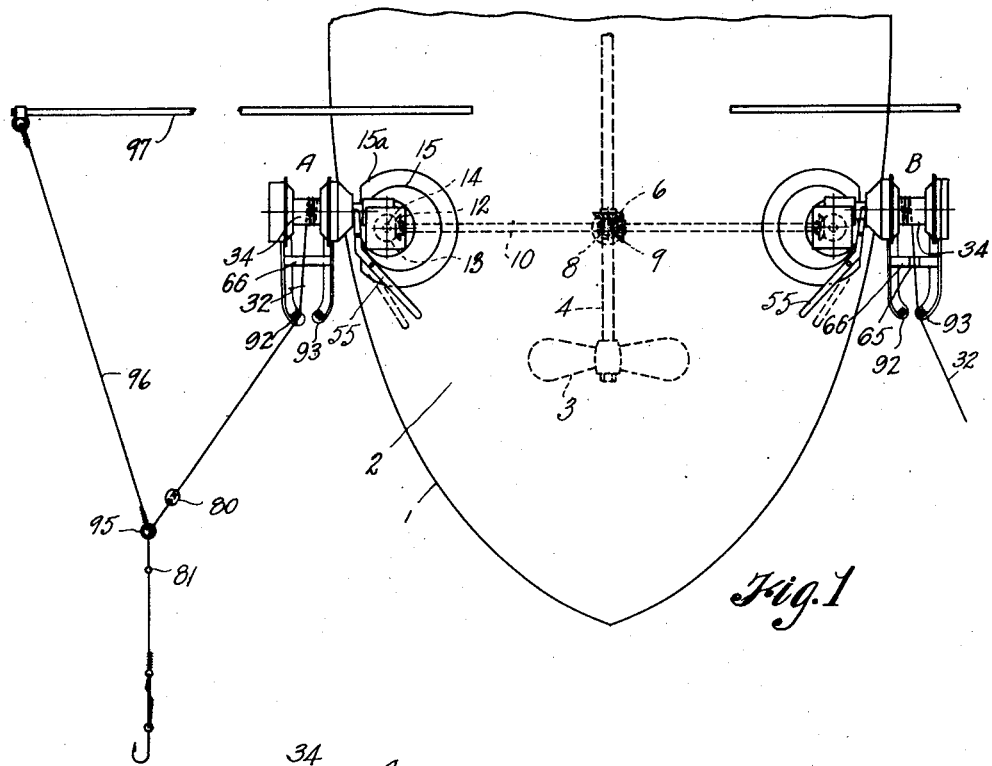
Fig. 1 is a plan view of the stern end of a fishing boat, as equipped with machines embodied by the present invention.
Figure 2:
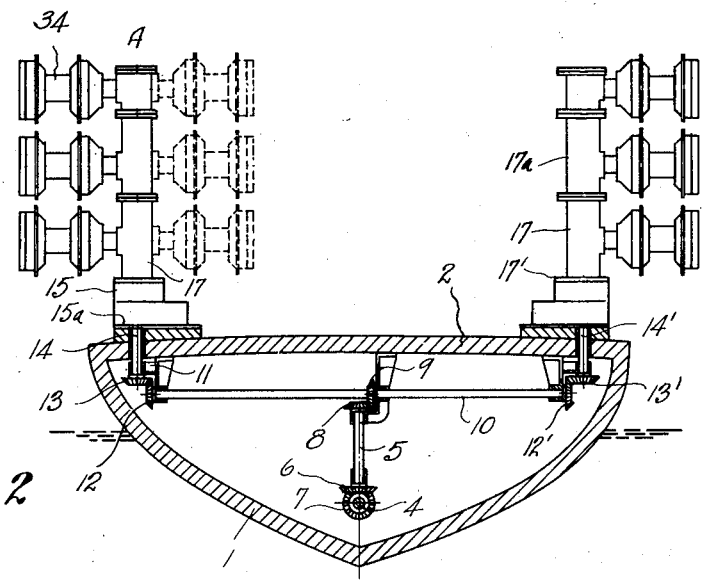
Fig. 2 is a cross section illustrating the means for driving the trolling machines from the propeller shaft of the boat.

Referring more in detail to the drawings:

In Figs. 1 and 2, we have illustrated a common type of fishing boat 1, having a deck 2 on which at port and starboard sides machines A and B, respectively, embodied by this invention, are mounted. The boat is propelled by the usual propeller 3, fixed on a driven shaft 4 from which shaft power is taken off to operate the trolling machines. The preferred arrangement of mechanism for driving the machines consists of a vertical shaft 5, rotatably supported by suitable means and connected at its lower end by intermeshing gears 6 and 7 with the shaft 4, and at its upper end connected by intermeshing gears 8 and 9 with a cross shaft 10. The cross shaft is supported rotatably in bearing brackets 11 fixed to the deck, and at its ends it has beveled gears 12—12' which drive gears 13—13' that are fixed on the lower ends of the main shafts 14—14' of the trolling devices A and B respectively.

In the following description only one of the trolling machines will be described in detail, since they are of the same construction, and it will be understood that the description will relate equally to either machine.

In its preferred form of construction, the trolling machine comprises a cast base 15 that may be flanged as at 15a and bolted or otherwise fixed to the deck of the boat or to a foundation provided therefor. The base 15 has a circular, upwardly opening top flange 16, within the lower end of a tubular standard 17 is rotatably fitted. This standard may consits of a plurality of separate sections 17a flanged at their ends and bolted together in end to end relation, each section carrying a reeling unit separate from the other, and as many units as desired may be assembled together by extension of the standard. In the present instance we have illustrated each machine as comprising three units, each unit including a winding reel and control mechanism therefor separate from the other.

The lower section of the standard 17 has a lateral base flange 17' of the same diameter as flange 16, and rests thereon. It also has an annular depending flange 17″ rotatably fitted within the upwardly opening flange 16 of base 15. The standard 17 is secured in place by means of lugs 18, mounted on bolts 19 secured to the base. These lugs have laterally extending flanges 18a overlying the base flange 17′ of the standard to retain the latter from displacement.

The main drive shaft 14 of the trolling machine is of sufficient length to accommodate all of the units mounted on the standard, and this shaft is extended co-axially of the standard, and is revoluble in suitable bearings provided for it, as designated at 20, and it is equipped with spiral gears as at 21, one of which is keyed to the shaft within each of the sections 17a, and which serves to drive the reel of the unit associated with that section of the standard.

Each of the sections 17a of the standard 17 is provided with a laterally opening, bearing socket 25 (see Fig. 7) in which is tightly fitted a hollow spindle shaft 26 which extends horizontally from the standard. Mounted within the spindle shaft, co-axially thereof and rotatable in bushings 29 and 30 fitted within the opposite ends of the spindle, is a shaft 28, rotatably driven by a spiral gear 31 that is keyed thereon at its inner end, and which meshes with a driving gear 21 keyed on the shaft 13.

A cable-winding drum 34 is rotatably mounted on the spindle shaft and is adapted to be driven for winding in the cable 32 that is coiled thereon by a friction disc clutch connection with the shaft 28. This clutch connection is designated in its entirety in Fig. 7 by reference character C, and it comprises a plurality of annular clutch discs 35 which have inwardly projecting lugs 35a at their inner edges slidably interlocked within grooves 36 (see Fig. 8) formed longitudinally of a clutch head 37 that is fixed to the outer end of the shaft 28. There are also annular clutch discs 38 alternating with the discs 35 and which have recesses 38a at their outer edges, which slidably contain ribs 40 that are formed in the axial direction of the interior of the outer end flange 34a of the winding drum. The clutch discs are so arranged that when clamped together they provide a friction grip driving connection between the clutch head 37 and the drum 34.

At its inner end the winding drum 34 has a flange 34b co-operating with the flange 34a to carry the cable, and to this flange is bolted an end plate or cover plate 44 which incloses a brake clutch mechanism designated in its entirety by reference character E in Fig. 7. The brake clutch mechanism comprises a clutch head 45 formed integral with the spindle shaft and on which annular clutch discs 46 are slidably mounted intermediate annular clutch discs 47 that are carried by the end flange 34b of the drum. These discs are identical in construction and are arranged like those of the clutch C, and when tightened together they effect a holding connection between the drum and the clutch head 45 to prevent rotation of the drum. A coiled spring 48 is enclosed within the end cover plate 44 of the drum about the spindle 26 and this bears at one end against the stationary clutch head 45 and at its other end against a bushing 50 slidable on the spindle and carried by the cover plate, so that its expanding tendency operates to urge the drum inwardly to holding or braking position.

In order to release the drum from the clutch E for paying out the cable, there is provided a release lever 55 pivotally mounted by a pivot pin or bolt 56 on a bracket 57 that is bolted, as at 58, to the standard. This lever has a yoke 59 at its inner end, embracing the spindle 26, with rounded knobs 59′ bearing against the outer end of bushing 50.

When the outer end of the lever 55 is swung laterally, as to the dotted line position 55a in Fig. 7, the drum will be shifted outwardly on the spindle to release the clutch E and set the clutch C so that the shaft 28 will then operate to drive the drum for winding in the cable. When the hand lever is released, the spring 48 moves the drum inwardly to release clutch C and set clutch E to hold the drum against rotation.

When it is desired to pay out a line, the hand lever is moved to an intermediate position to adjust the drum to a position at which it is free of both clutches and may revolve freely to permit the line or cable to unwind therefrom; it being understood that the line will be pulled out by reason of its drag in the water.

In connection with the reel we have provided means for automatically releasing the winding-in clutch C at any point of the line so that an operator need not pay strict attention to the reeling-in action after it has been started.

This mechanism, as shown in Figs. 7, 10 and 11, comprises a pair of parallel rollers 65—66 between which the cable passes to and from the drum. The lower roller 65 is rotatably supported by trunnions 65′ at its ends rotatably in upright flanges 67—67 of a lateral arm 68 of bracket 57. The upper roller 66 is swingingly supported for movement toward and from roller 65 by a bracket arm 70 which is carried by a pivot pin 71 fixed in a projecting arm 72 on bracket 57. The bracket arm 70 also has an upwardly directed arm 73 which swings therewith during upward or downward movement of roller 66.

By reference to Fig. 7 in particular, it will be observed that a slide bolt 75 having a mounting clevis 75′ is pivotally connected by a bolt 76 with the hand lever, and this slide has its other end slidable through a guide opening 77 in the arm 72 and adapted to extend across the path of movement of the arm 73. When the hand lever is adjusted to a position, as at 55a in Fig. 7, for setting the clutch C to wind in the cable, the arm 73 then drops to a position at which it retains the bolt 75 against inward movement and thereby holds the lever 55 and retains the clutch set. In this position of the arm 73 the rollers 65 and 66 are close together and bear against opposite sides of the cable being drawn in.

To automatically release the clutch and stop the winding action of the drum, we place a ball or the like 80 on the line so that the line may slide freely therethrough, then at a desired point on the line we fix a stop 81 on the line; this usually would be near the outer end thereof, and will not pass through the ball 80. When the stop engages the ball, the ball will be pulled with the line between the rollers 65—66 and will move roller 66 upwardly to thereby actuate arm 73 upwardly and release the slide bolt for inward swinging of the hand lever and a resultant inward shifting of the drum which will stop it by setting clutch E and releasing clutch C.

If it should be desired to stop the winding action at any time, this may be done by swinging arm 73 upwardly by hand.

In Fig. 12, we have illustrated an alternative construction in which the roller 66 is carried by a bracket provided with a handle 90 used for manual adjustment of the bracket.

A feature of the construction of the automatic mechanism resides in the fact that the tension of the spring 48 may be adjusted so as to permit slippage in the driving clutch when a certain pull is exerted on the cable. This adjustment is made by extending or shortening the effective length of the slide bolt 75 by threading it into or outwardly from its mounting clevis 75'.

In Fig. 1, we have shown the reel adjusted to its outboard position, and the cable 32 is extended therefrom between the rollers 65 and 66 and also between vertical spaced apart guide rollers 92 and 93 carried by brackets 94 extended from upper and lower ends of the standard and then passed through a ring 95 on a supporting cable 96 that is attached to the outer end of a pole 97 extending from the side of the boat. A stop ball 80 is slidable on the line but does not pass beyond the ring 95. The line is permitted to reel out by adjusting the hand lever 55 to an intermediate position, thereby shifting the drum so that it is released from both clutches C and E. When the line has passed out to the desired length, the reel is held by pulling the lever to the position 55a of Fig. 7, thereby adjusting the drum to its outer position, at which the clutch C is released and the clutch E is set. When a fish is caught on the line the operator sets the reel in motion by pulling the hand lever to the position 55a, where it will be held by reason of the bracket arm 73 dropping downwardly to a position to prevent inward movement of the slide bolt 75. With the desired tension placed on the spring 48 by proper adjustment of the slide bolt in its clevis, should the fish start to run and fight there will be slippage of the clutch to a certain extent which will allow the fish to run until tired; then the clutch again takes effect and the reeling-in operation is continued.

When the stop member on the line engages with the ball 80 it carries the ball between the rollers 65 and 66 and by spreading them apart thereby releases the lever and permits the spring 48 to set the brake E to hold the reel against rotation.

Devices of this character may embody any desired number of reels and by reason of their arrangement they occupy a minimum amount of space on the boat and the device is so constructed that it permits the disposition of the reels outboard of the boat where they will not be in the way. However, the reels may be adjusted to the inboard position simply by loosening the lugs 18 sufficiently that the entire standard may be rotated to swing the reel inboard.

Having thus described our invention, what we claim as new therein and desire to secure by Letters Patent is:

1. A cable-winding device comprising a mounting spindle, a cable-winding drum rotatable and shiftable thereon, a shaft rotatable within the spindle, means for rotating the shaft, a brake associated with the drum and spindle for normally retaining the drum against unwinding, a clutch associated with the drum and shaft through which the drum may be rotated for winding, and means manually adjustable for positioning the drum at neutral position free of either brake or clutch, and for selectively engaging it with either the brake or clutch.

2. A device of the character described, comprising a supporting spindle mounting a drum brake, a shaft extended through the spindle and mounting a drum driving clutch, gearing for driving the shaft, a cable-winding drum rotatable on the spindle between the said brake and clutch, yieldable means urging the drum against the drum brake to retain it against unwinding, a hand lever movable to shift the drum to a neutral position between the brake and clutch for unwinding and to a position against the driving clutch for winding.

3. A device of the character described comprising a spindle mounting a friction brake, a shaft within the spindle mounting a friction driving clutch at one end, gearing for rotatably driving the shaft, a cable-winding drum revoluble on the spindle between the brake and clutch and shiftable in opposite directions on the spindle into holding engagement with either the brake or clutch, a spring engaging the drum and yieldingly urging it against the brake against unwinding, a shifting lever engaging the drum and movable to shift the drum against the spring pressure to a position free of the brake for unwinding, and to a farther position to engage the driving clutch for winding; said spring returning the drum to the brake when the lever is released.

4. A device of the character described, comprising a supporting spindle having a brake thereon, a shaft within the spindle having a driving clutch head at its outer end, means for rotating the shaft, a cable-winding drum rotatable and longitudinally shiftable on the spindle between the brake and clutch, a spring under tension engaging the drum to yieldingly retain the latter against the brake to prevent unwinding, a pivoted hand lever movable against the drum to shift it to a neutral position for unwinding and to a farther position to engage the driving clutch for winding, a latch mechanism for retaining the lever in set position for winding, and a release device operable by the cable to trip the latch to release the lever for return of the drum by the spring against the brake.

5. A device of the character described, comprising a supporting spindle, a cable-winding drum rotatable and shiftable thereon, a cable wound on the drum, a brake on the spindle, a shaft extended through the spindle, gearing for driving the shaft, a driving clutch on the said shaft, a pivotally fixed handle lever engageable with the drum for shifting it from the brake to a neutral position for unwinding or into holding engagement with the driving clutch for winding, a releasable latch mechanism for holding the lever in the set position for winding, means adjustable on the cable and operable thereby to trip the latch mechanism to release the lever and yieldable means engaging the drum for shifting it against the brake when the lever is released.

6. A device of the character described comprising a drum-mounting spindle, a cable-winding drum rotatable and longitudinally shiftable on the spindle, a shaft extended through the spindle, driving means for the shaft, a brake on the spindle at one end of the drum, a driving clutch on the shaft at the other end of the drum, a spring bearing against the drum and normally retaining it in contact with the brake to prevent unwinding, a pivoted hand lever operable against the drum to shift it to neutral position between the brake and clutch for unwinding or into holding contact with the driving clutch for winding, a cable on the drum, cable-guiding means between which the cable is guided in its travel to the drum, a latch for retaining the lever when set in winding position, a ball stop fixed on the cable, a ball on the cable seated against the stop and adapted to be drawn by the cable through the cable-guiding means to spread them apart, and a latch release operable by the spreading of said cable guiding means to release the lever.

7. In a cable-winding device of the character described, a mounting spindle, a cable-winding drum rotatable thereon, a rotatable shaft extended through the spindle, means for rotating the shaft, a brake on the spindle at one end of the drum, a friction-driving clutch on the shaft at the other end of the drum, means for yieldably holding the drum against the brake, means for shifting it against the driving clutch, and means for yieldingly holding the drum against the clutch to permit slippage of the driving clutch at a predetermined pull on the cable.

8. A cable-winding means comprising a vertical standard, a plurality of spindles supported therefrom, and adjustable to different radial positions relative to each other, a cable-winding drum on each spindle, brakes on the spindles for retaining their respective drums against unwinding, a drum-driving shaft in each spindle, driving means in the standard common to all the drum-driving shafts, a driving clutch on each shaft for driving its respective drum, means normally retaining the drums against the brakes, and means for each drum whereby it may be shifted against its driving clutch for winding or to a neutral position for unwinding.

9. A cable-winding means comprising a base, a standard supported rotatably thereon, a plurality of spindles mounted on the standard one above the other, a shaft extended vertically within the standard, means for driving the shaft, a cable-winding drum rotatable on each of the spindles, a drum-holding brake on each spindle, a drum-driving shaft rotatable in each spindle, means operatively connecting the said shafts with the vertical shaft, each drum shaft having a drum driving clutch at its outer end, yieldable means normally retaining the drums against their brakes, a hand lever associated with each drum whereby it may be shifted against its driving clutch for winding or to a neutral position for unwinding, latches for holding the levers in set position for winding, and means on the cable operable to release the latches.

10. A cable winding device comprising a non-rotative axial support, a cable winding drum rotatable on the support and shiftable longitudinally thereon, a brake on the support at one end of the drum, a shaft extending through the support, means for driving the shaft, a clutch on the shaft at the other end of the drum and means for manually shifting the drum from a neutral position into holding contact with the brake or with the clutch.

11. A device of the character described comprising a stationary mounting spindle having a brake flange thereon, a shaft extending axially through the spindle and provided at its outer end with a driving clutch, gearing for driving the shaft, a cable winding drum rotatably mounted on the spindle and movable longitudinally thereof between the said brake flange and said clutch and formed at its ends with housings enclosing the brake and clutch, a cable wound on the drum and extending therefrom, a spring coil about the spindle and bearing against the drum and against the brake flange to yieldingly retain the drum frictionally engaged with the brake to prevent unwinding of the cable, a pivotally mounted hand lever engaging the drum and operable by initial longitudinal movement of the drum to disengage it from the brake for unwinding of the cable, and by an additional movement to engage it with the clutch for winding in the cable, releasable means for holding the lever in the latter position and means on the cable engageable with the releasable means for releasing it.

DONIS M. BARDON.
FREDERICK G. GREAVES.
SERN P. WATT.